G. W. BELL.
APPARATUS FOR SHAPING THE OUTER CASINGS OF PNEUMATIC TIRES.
APPLICATION FILED MAY 16, 1911.

1,132,904.

Patented Mar. 23, 1915.
3 SHEETS—SHEET 1.

WITNESSES.
M. G. Crawford
J. K. Cole

INVENTOR.
George Wilson Bell

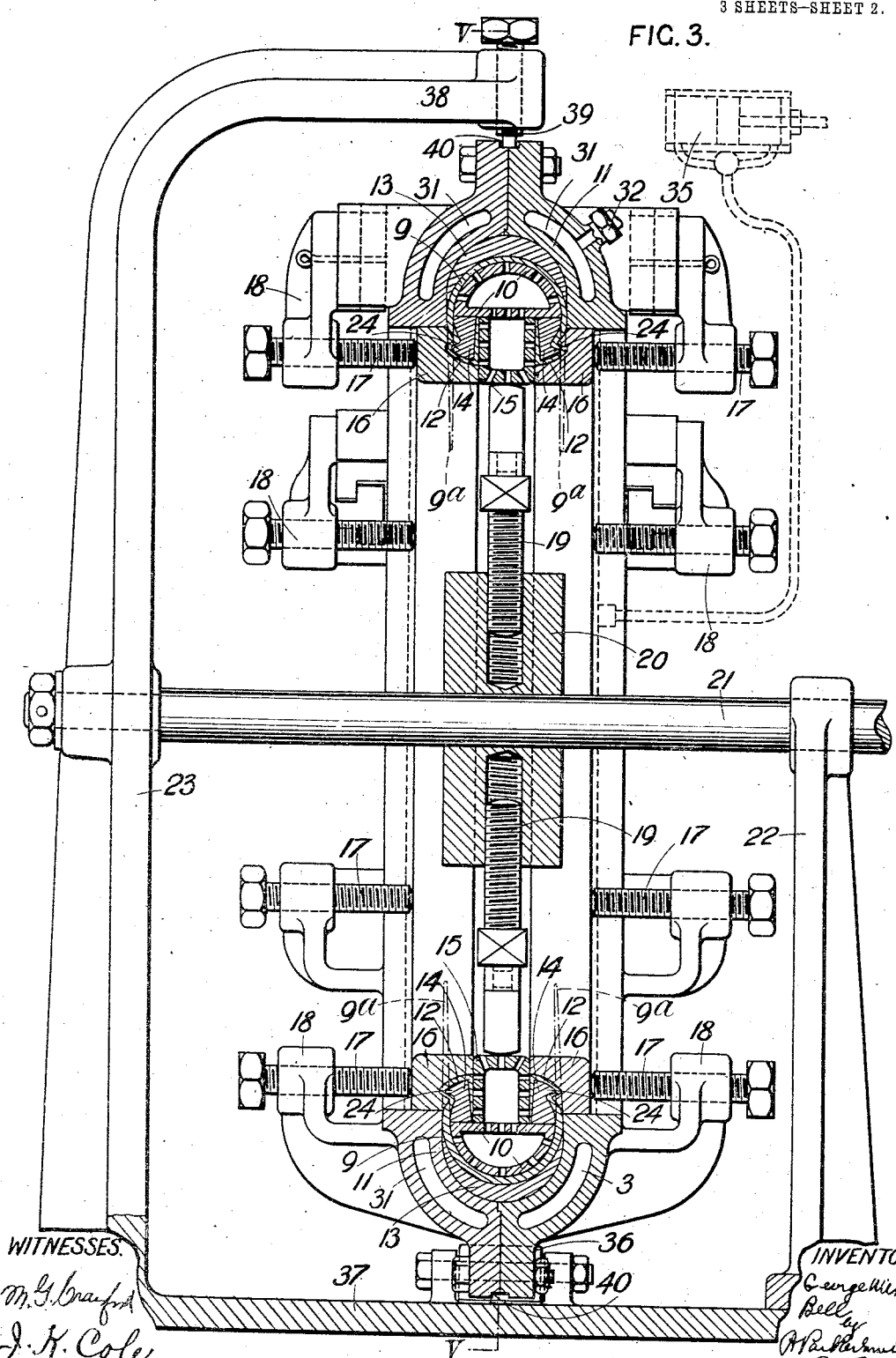

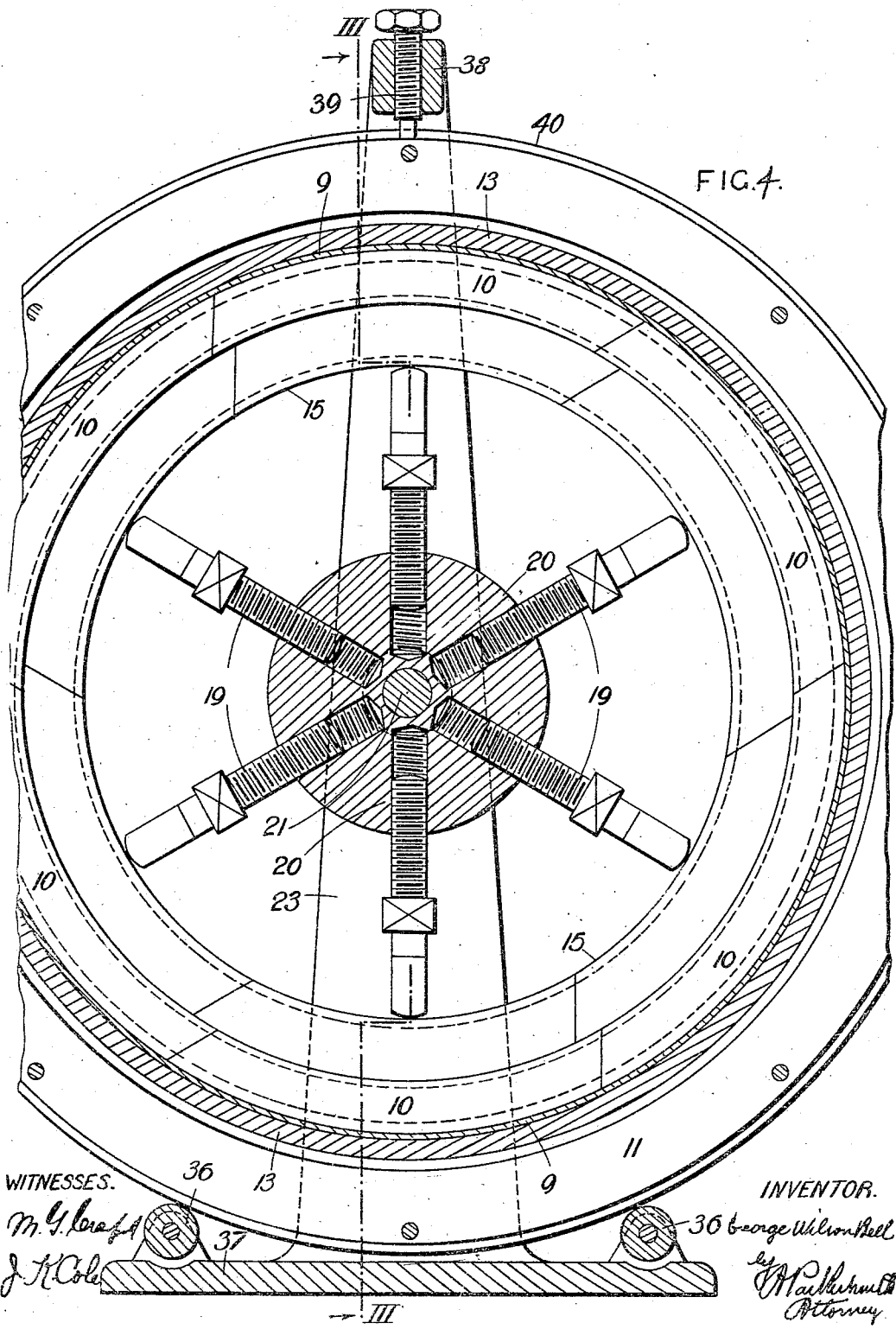

UNITED STATES PATENT OFFICE.

GEORGE WILSON BELL, OF STOCKPORT, ENGLAND.

APPARATUS FOR SHAPING THE OUTER CASINGS OF PNEUMATIC TIRES.

1,132,904. Specification of Letters Patent. Patented Mar. 23, 1915.

Original application filed February 10, 1911, Serial No. 607,811. Divided and this application filed May 16, 1911. Serial No. 627,432.

*To all whom it may concern:*

Be it known that I, GEORGE WILSON BELL, a subject of the King of Great Britain and Ireland, and a resident of Stockport, in the county of Chester, England, have invented certain new and useful Improvements in and Pertaining to Apparatus for Shaping the Outer Casings of Pneumatic Tires, of which the following is a specification.

This application for Letters Patent relates to apparatus for making leather outer casings or covers for the air tubes of pneumatic tires according to the method of manufacture described in the specification and forming the subject matter of concurrent application, Serial No. 627433. In this method of manufacture a bead suitable for securing the tire to an ordinary clencher or analogous wheel rim is formed at each edge of an annular band of leather of U-shape in cross-section, by bending a lateral edge portion of the band inwardly around a suitably shaped removable bead-forming piece in order to form a recess for the reception of a core, removing the said bead-forming piece, and finally securing a suitably shaped core in said recess.

Figure 1:
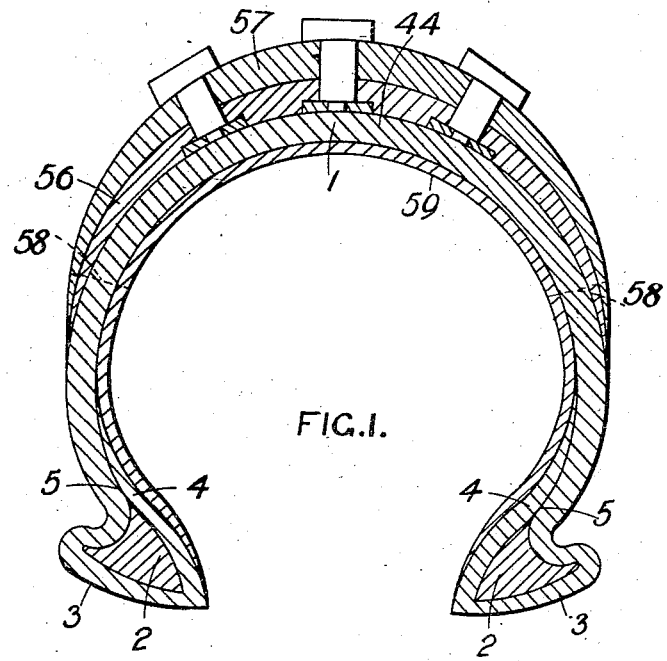
Figure 2:
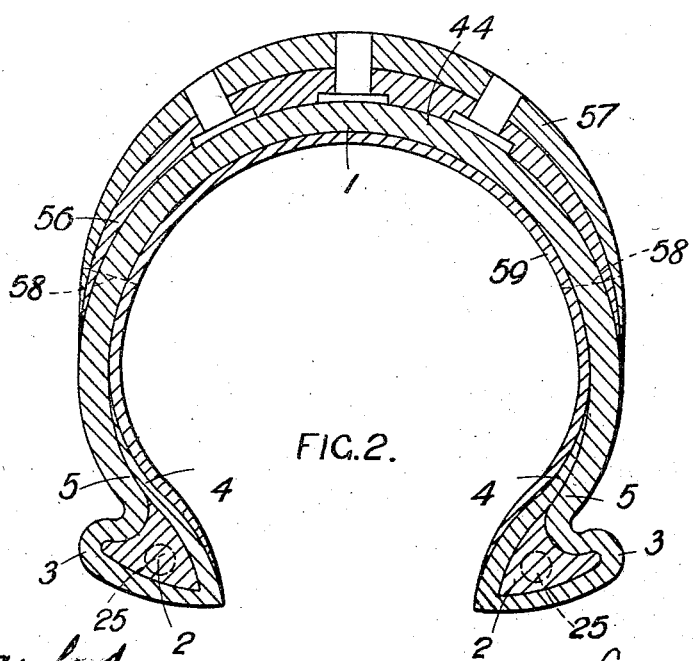

The apparatus forming the subject matter of this application comprises the various features hereinafter defined and set out in the claims, and is illustrated by the accompanying drawings, of which, Figures 1 and 2 are cross-sections of two examples of leather tire covers made by apparatus according to this application. Fig. 3 shows the apparatus in vertical section, and Fig. 4 is a view taken at right angles to Fig. 3 and corresponds partly to the line V of Fig. 3, which itself corresponds to the line III of Fig. 4.

In each of the examples of tire covers shown in Figs. 1 and 2, 1 is a strip of leather curved to the ordinary cross-sectional form of a tire cover, and at each of its edges so bent about a core 2 as to form in conjunction with the core a bead 3 suitable for securing the tire to an ordinary clencher or analogous wheel rim, the extreme edge portion 4 of the strip at each side thereof being chamfered and cemented, and, it may be, sewn, to the internal surface of the cover at 5. Each core 2 may be of leather, or of rubber, and, as indicated by dotted lines in Fig. 2, may have an internal ring 25 of inextensible or comparatively inextensible material, or each core 2 may itself be a ring of inextensible material.

The cover may as shown, be provided with a lining 59 of thin leather, which may be cemented thereto, except at its edges, which are suitably secured to the edge portions of the cover 44 as by being cemented thereto.

To protect the tread portion of the cover, 44, a ring 56 formed of a U-shaped strip of undried chrome leather, or composed of two or more such strips and laced end to end and having their chamfered ends secured together, may be cemented to the exterior of the cover 44, the joints of the ring 56 being arranged so as not to be opposite those of the cover 44. Another similar ring 57 may, as shown, be cemented to the exterior of the ring 56. The ring or rings 56 and 57 which are renewable, may advantageously, in addition to being cemented, be secured to the cover 44 by means of rows of stitching 58, and may be formed or provided with suitable non-skidding or wear-resisting devices.

The apparatus, shown in Figs. 3 and 4, comprises an annular mold 11, and dies 10 of semi-circular cross-section for clamping the U-shaped band of leather in the mold 11. As will be seen from Fig. 4 the dies 10 are six in number, and, to facilitate insertion into the mold, are made so that each overlaps radially inward an adjacent one, and one of them thus overlaps two adjacent ones. Against the edges of the mold 11 are adapted to be arranged transversely movable dies 16, which form annular continuations of the mold 11, and are adapted to be moved transversely by means of screws 17 engaging in lugs 18 projecting from the mold 11. For the purpose of enabling the dies 16 (and the bead-forming pieces 14 and dies 28 hereinafter referred to) to be inserted and removed the lugs 18 on half of the periphery at each side of the mold 11 are adapted to slide radially in the mold, as indicated in the upper half of Fig. 3.

For the purpose of molding the edge portion of the cover (Fig. 3) bead-forming pieces 14 (of which there are three at each side to facilitate insertion) are located between the two dies 16, and between the bead-forming pieces 14 at opposite sides of the mold are adapted to be moved radially outward dies 15, which are similar to the dies 10 as to number and as to overlapping. The dies 10 and 15 are forced into and held in position by means of screws 19 engaging in a block 20, mounted loosely on a shaft 21, which, when the block 20 has been brought into position, is supported by a bracket 22 and a standard 23.

To effect drying of the leather during the process of molding the mold 11 is formed with cavities 31, which are supplied through unions 32 with steam or hot water, and the dies 10 and 15 are perforated to allow of the escape of vapor. To assist the drying, plates, indicated by dotted lines in Fig 3, may be placed between the screws 17 and the dies 28, the shaft 21 being first withdrawn, and the chamber formed by and between the plates connected, as indicated by dotted lines, with an air-pump 35.

To enable the mold to be rotated freely to facilitate the manipulation of the leather and of the apparatus, the mold 11 is supported by two rollers 36 mounted on a base piece 37 to which are secured the bracket 22 and the standard 23, which at its upper end has a horizontal portion 38 from which a set-screw 39 projects into an annular groove in the mold 11.

In the drawings the mold 11 is shown containing a liner 13 which is intended to be removed when, as may, advantageously be done, the two external bands or rings 56 and 57 are formed simultaneously in the mold 11. In such a case internal dies slightly differing in form from the dies 10 are employed.

In using the hereinbefore described apparatus to make a tire cover a band 9 (Fig. 3) formed of a strip of undried chrome leather, or composed of two or more such strips placed end to end and having their chamfered ends secured together, is clamped in the mold 11 by the dies 10 so that it assumes a U-shape in cross-section and has its edge portions 12, which are chamfered, projecting radially inward, as indicated at 9ª by dotted lines in Fig. 3. The projecting edge portions 12 are then turned laterally inward over the bead-forming pieces 14 by means of the transversely movable dies, or mold continuations, 16, and the laterally inturned portions forced radially outward and pressed against the bead-forming pieces 14 by means of the internal radially movable dies 15. The dies 16 are then still farther advanced to press the sides of the band against the bead-forming pieces 14 so as to form the recesses 24 for the reception of the cores 2. It will be seen that the bead-forming pieces 14 in addition to being so shaped as to produce the bead recesses 24 also act as abutments for the turning over of the edge portions 12. Comparatively little if any lateral pressure is exerted upon the bead-forming pieces 14 during the operation of turning the edge portions 12 laterally inward and not until the dies 15 have pressed the edge portions against the internal faces of the bead-forming pieces 14 is any appreciable pressure brought to bear on the external lateral faces of the bead-forming pieces by the dies 16 to force the leather against the bead-forming pieces to produce the bead recesses 24. The tire cover may be subsequently finished by pressing the turned over edge portions 12 of the strip, preferably after the application of adhesive material against the internal faces of the side walls 26 of the partly formed cover 44 by means of suitable external dies, which are adapted to complete the formation of the beads 3, and suitable internal dies which are adapted to give to the interior of the radially internal portion of the cover a shape suited to the securing devices with which the cover is to be used. The band or partly finished cover is, if necessary, cut to the length required to produce a cover of the desired diameter and the chamfered ends of the strip, or strips, are cemented, and, if necessary, sewn, together.

It will be evident that hydraulic or pneumatic apparatus might be employed instead of screws for operating the various dies.

What I claim is:—

1. A device for shaping the outer casings of pneumatic tires, comprising, in combination, an annular bead-forming piece, a transversely movable die adapted to press an edge portion of a band of leather against said bead forming piece and to turn a radially internal portion thereof transversely over said bead-forming piece, and a radially movable die adapted to act on said internal portion so turned transversely and to press it radially outward against said bead-forming piece to form a recess suitable for the reception of a core.

2. A device for shaping the outer casings of pneumatic tires, comprising, in combination, a mold of concave cross-section, means for clamping a band of leather in said mold, an internal bead-forming piece, a transversely movable external die adapted to act upon the outer side of a projecting edge portion of a band so clamped and to turn a radially internal portion thereof laterally inward over said bead-forming piece, and a radially movable internal die adapted to act on said internal portion so turned laterally inward and to press it radially outward against said bead-forming piece, to form a recess suitable for the reception of a core.

3. A device for shaping the outer casings of pneumatic tires, comprising, in combination, an annular bead-forming piece, formed with an annular groove on one side, a transversely movable die provided with an annular projection corresponding to said annular groove and adapted to press an edge portion of a band of leather against said bead-forming piece and to turn a radially internal portion thereof transversely over said bead-forming piece, and a radially movable die adapted to act on said internal portion so turned transversely and to press it radially outward against said bead-forming piece to form a recess suitable for the reception of a core.

4. A device for shaping the outer casings of pneumatic tires, comprising, in combination, an annular mold of concave cross-section, internal dies adapted to clamp a band of leather in said mold, means for securing said dies in position in said mold, and means for supporting said mold in such manner as to enable it to be turned about its axis, said means being independent of the means for securing said dies in position in said mold.

5. A device for shaping the outer casings of pneumatic tires, comprising, in combination, an annular bead-forming piece, a transversely movable die adapted to press an edge portion of a band of leather against said bead-forming piece and to turn a radially internal portion thereof transversely over said bead-forming piece, devices for moving said die transversely, and a radially movable die adapted to act on said internal portion so turned transversely and to press it radially outward against said bead-forming piece to form a recess suitable for the reception of a core.

6. A device for shaping the outer casings of pneumatic tires, comprising, in combination, an annular bead-forming piece, a transversely movable die adapted to press an edge portion of a band of leather against said bead-forming piece and to turn a radially internal portion thereof transversely over said bead-forming piece, a radially movable die adapted to act on said internal portion so turned transversely and to press it radially outward against said bead-forming piece to form a recess suitable for the reception of a core, and means for moving radially said radially movable die.

7. A device for shaping the outer casings of pneumatic tires, comprising, in combination, an annular bead-forming piece, a transversely movable die adapted to press an edge portion of a band of leather against said bead-forming piece and to turn a radially internal portion thereof transversely over said bead-forming piece, devices for moving said die transversely, a radially movable die adapted to act on said internal portion so turned transversely and to press it radially outward against said bead-forming piece to form a recess suitable for the reception of a core, and means for moving radially said radially movable die.

8. A device for shaping the outer casings of pneumatic tires, comprising, in combination, a mold of concave cross-section, means for clamping a band of leather in said mold, an internal bead-forming piece, a transversely movable die adapted to act upon the outer side of a projecting edge portion of a band so clamped and to turn a radially internal portion thereof laterally inward over said bead-forming piece, a radially movable internal die adapted to act on said internal portion so turned laterally inward and to press it radially outward against said bead-forming piece to form a recess suitable for the reception of a core, devices for moving said transversely movable die, and abutments for said devices secured to said mold.

9. A device for shaping the outer casings of pneumatic tires, comprising, in combination, a mold of concave cross-section, means for clamping a band of leather in said mold, an internal bead-forming piece, a transversely movable external die adapted to act upon the outer side of a projecting portion of a band so clamped and to turn a radially internal portion thereof laterally inward over said bead-forming piece, a radially movable internal die adapted to act on said internal portion, so turned laterally inward and to press it radially outward against said bead-forming piece, to form a recess suitable for the reception of a core, devices for moving said transversely movable die, and abutments for said devices secured to said mold, certain of said abutments being movable radially to facilitate the removal and insertion of said clamping means and said external die.

Signed at Manchester, in the county of Lancaster, England, this 4th day of May, 1911.

GEORGE WILSON BELL.

Witnesses:
JOHN WILLIAM THOMAS,
MALCOLM SMETHURST.